United States Patent
Yang

(10) Patent No.: US 7,783,153 B2
(45) Date of Patent: Aug. 24, 2010

(54) METHOD AND APPARATUS FOR REPRODUCING MULTIMEDIA DATA

(75) Inventor: Woo-seong Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1023 days.

(21) Appl. No.: 10/889,064

(22) Filed: Jul. 13, 2004

(65) Prior Publication Data

US 2005/0019001 A1    Jan. 27, 2005

(30) Foreign Application Priority Data

Jul. 22, 2003    (KR) .................. 10-2003-0050342

(51) Int. Cl.
*H04N 5/91* (2006.01)
*H04N 7/00* (2006.01)

(52) U.S. Cl. .................. 386/46; 386/125; 358/501

(58) Field of Classification Search ............ 386/46, 386/125; 358/501
See application file for complete search history.

(56) References Cited

U.S. PATENT DOCUMENTS 5,862,107 A * 1/1999 Goto .................. 386/126
2002/0167972 A1 * 11/2002 Okamoto .................. 370/537
2002/0186405 A1   12/2002 Gragg et al. ............... 358/1.15
2003/0084462 A1 *  5/2003 Kubota et al. .............. 725/153
2003/0107750 A1 *  6/2003 Takamine et al. ........... 358/1.1

FOREIGN PATENT DOCUMENTS

| JP | 2000-224524 | 8/2000 |
| JP | 2002-312151 | 10/2002 |

* cited by examiner

*Primary Examiner*—Thai Tran
*Assistant Examiner*—Girumsew Wendmagegn
(74) *Attorney, Agent, or Firm*—Roylance, Abrams, Berdo & Goodman, L.L.P.

(57) ABSTRACT

A method and apparatus for reproducing multimedia data. The method and apparatus for reproducing multimedia data receives externally-provided multimedia data, separates video data, audio data, and synchronization data from the received multimedia data, and extracts a synchronization signal from the synchronization data. The method and apparatus further synchronizes an operation of printing and reproducing an image corresponding to the video data and an operation of reproducing sound corresponding to the audio data with each other using the extracted synchronization signal and performing the operations.

14 Claims, 5 Drawing Sheets

METHOD AND APPARATUS FOR REPRODUCING MULTIMEDIA DATA

PRIORITY INFORMATION

This application claims the benefit under 35 U.S.C. §119 (a) of Korean Patent Application No. 2003-50342, filed on Jul. 22, 2003, in the Korean Intellectual Property Office, the entire disclosure of which is incorporated herein by reference.

BACKGROUND OF THE INVENTION

1. Field of the Invention

The present invention relates to processing of multimedia data having data related to both image and sound. More particularly, the present invention relates to a method and apparatus for reproducing multimedia data by which an image included in multimedia data is printed and is reproduced together with sound.

2. Description of the Related Art

In general, multimedia data generated in a portable wireless communication device, such as a personal digital assistant (PDA) or a mobile phone, includes both audio data and video data. When such multimedia data is reproduced in a personal computer (PC), both an image corresponding to video data and sound corresponding to audio data can be synchronized with each other and reproduced together.

Meanwhile, multimedia data may be reproduced using a printer (not using a reproducing apparatus, such as a PC). In this way, U.S. Pat. No. 5,524,085 discloses a conventional apparatus for reproducing multimedia data using a printer entitled by "Multimedia Job Tickets for Printing Machines".

Hereinafter, a conventional method for reproducing multimedia data disclosed in the above U.S. Patent will be described. First, data in which image data is mixed with multimedia data is generated in a personal computer. Job ticket data is stored in a queue memory, and print data corresponding to an image to be actually printed is stored in a compiler, sent to a printer, and printed. A branching means extracts multimedia data from job ticket information and provides the extracted multimedia data to a synthesizer. In this case, the synthesizer provides the extracted multimedia data to a speaker, and the speaker reproduces sound corresponding to the extracted multimedia data. Here, reproduced sound, such as multimedia data contained in the job ticket data is a user's instruction, such as "Bind the printed books in blue covers," for example.

In conventional methods for reproducing multimedia data including the above-described method, an image corresponding to video data contained in multimedia data is printed, and simultaneously, sound corresponding to audio data can be reproduced. However, sound is not reproduced together with the image but separately reproduced. Thus, when the multimedia data includes video data and audio data for one movie, that is, when an image corresponding to video data contained in the multimedia data and sound corresponding to audio data need to be reproduced in time synchronization with each other and reproduced together, in the conventional methods for reproducing multimedia, sound cannot be reproduced while printing the image. In other words, only the image is printed, and sound is lost.

For example, a first user can take a photograph or video using a portable camcorder or a mobile phone with a built-in digital camera and transmit motion picture data which is multimedia data corresponding to a photographing result to a second user. When the second user receives the motion picture data from the first user and prints the motion picture transmitted by the first user using the conventional method for reproducing multimedia data, the second user cannot reproduce sound contained in the motion picture simultaneously.

SUMMARY OF THE INVENTION

The present invention provides a method and apparatus for reproducing multimedia data by which an image contained in the multimedia data is printed, and simultaneously, sound is reproduced.

According to an aspect of the present invention, there is provided a method for reproducing multimedia data, the method comprising the steps of receiving externally-provided multimedia data, separating video data, audio data, and synchronization data from the received multimedia data, and extracting a synchronization signal from the synchronization data. The method further comprises synchronizing an operation of printing and reproducing an image corresponding to the video data and an operation of reproducing sound corresponding to the audio data with each other using the extracted synchronization signal and performing the operations.

According to another aspect of the present invention, there is provided an apparatus for reproducing multimedia data, the apparatus comprising a data processing unit, which receives externally-provided multimedia data, separates video data, audio data, and synchronization data from the received multimedia data, and extracts a synchronization signal from the synchronization data. The apparatus further comprises a data reproducing unit, which synchronizes an operation of printing and reproducing an image corresponding to the separated video data and an operation of reproducing sound corresponding to the separated audio data with each other in response to the extracted synchronization signal and performing the operations.

BRIEF DESCRIPTION OF THE DRAWINGS

The above and other features and advantages of the present invention will become more apparent by describing in detail exemplary embodiments thereof with reference to the attached drawings in which.

Throughout the drawings it should be understood that like reference numerals are used to depict like features and structures.

DETAILED DESCRIPTION OF THE INVENTION

Figure 1:
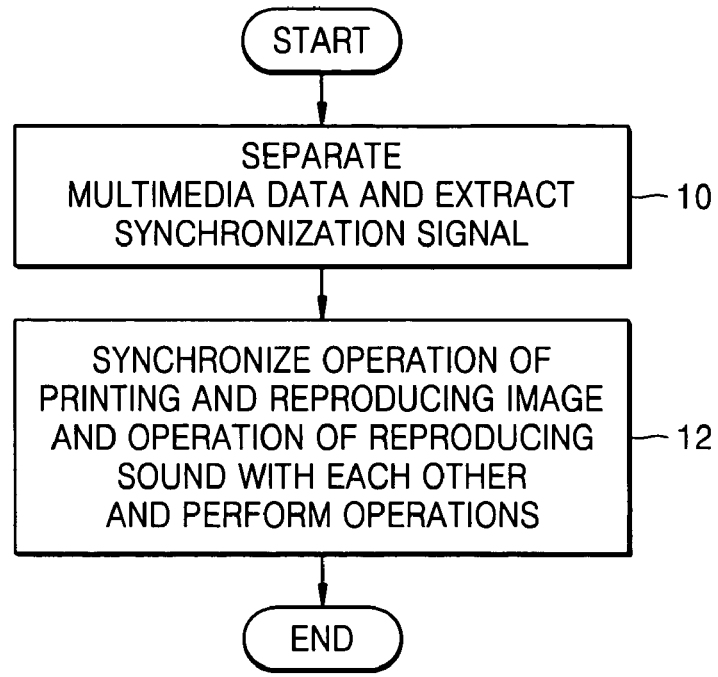
FIG. 1 is a flowchart illustrating a method for reproducing multimedia data according to an embodiment of the present invention.

Hereinafter, a method for reproducing multimedia data according to an embodiment of the present invention will be described in detail with reference to the attached drawings. FIG. 1 is a flowchart illustrating a method for reproducing multimedia data according to an embodiment of the present invention. Referring to FIG. 1, the method for reproducing multimedia data according to an embodiment of the present invention comprises synchronizing printing of an image with reproducing of sound from video data and audio data separated from multimedia data and performing printing of the image and reproducing of sound (steps 10 and 12).

In the method for reproducing multimedia data according to an embodiment of the present invention, first, in step 10, externally-provided multimedia data is received, video data, audio data, and synchronization data are separated from the received multimedia data, and a synchronization signal is extracted from the separated synchronization data. Here, the multimedia data may be input from a personal computer (PC), personal digital assistant (PDA), a camera phone which is a mobile phone with a built-in digital camera, a digital camcorder, or the like.

Figure 2:
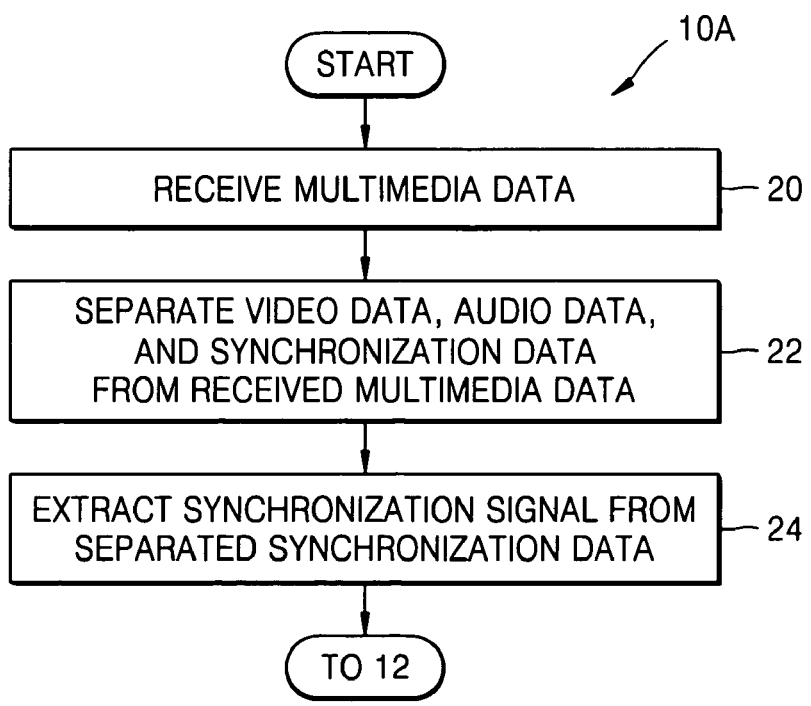
FIG. 2 is a flowchart illustrating step 10 shown in FIG. 1, according to an embodiment of the present invention.

FIG. 2 is a flowchart illustrating step 10 shown in FIG. 1, according to an embodiment of the present invention. Referring to FIG. 2, the method 10A includes separating video data and audio data from multimedia data and extracting a synchronization signal from separated synchronization data (steps 20 through 24).

First, in step 20, multimedia data is received. Here, the multimedia data may be received via a wire or wireless network bus.

In step 22, video data, audio data, and synchronization data are separated from the received multimedia data. Here, each of the separated video data and the separated audio data has a bitstream format. For example, the separated synchronization data may be synchronization information used in a motion picture expert group 4 (MPEG-4) standard. In this case, the synchronization information has information needed in synchronizing video data and audio data contained in a unit packet with each other and reproducing the video data and the audio data.

In step 24, a synchronization signal is extracted from the separated synchronization data.

Meanwhile, in step 12 (FIG. 1), an operation of printing and reproducing an image corresponding to video data and an operation of reproducing sound corresponding to audio data are synchronized with each other using the extracted synchronization signal and performed.

Figure 3:
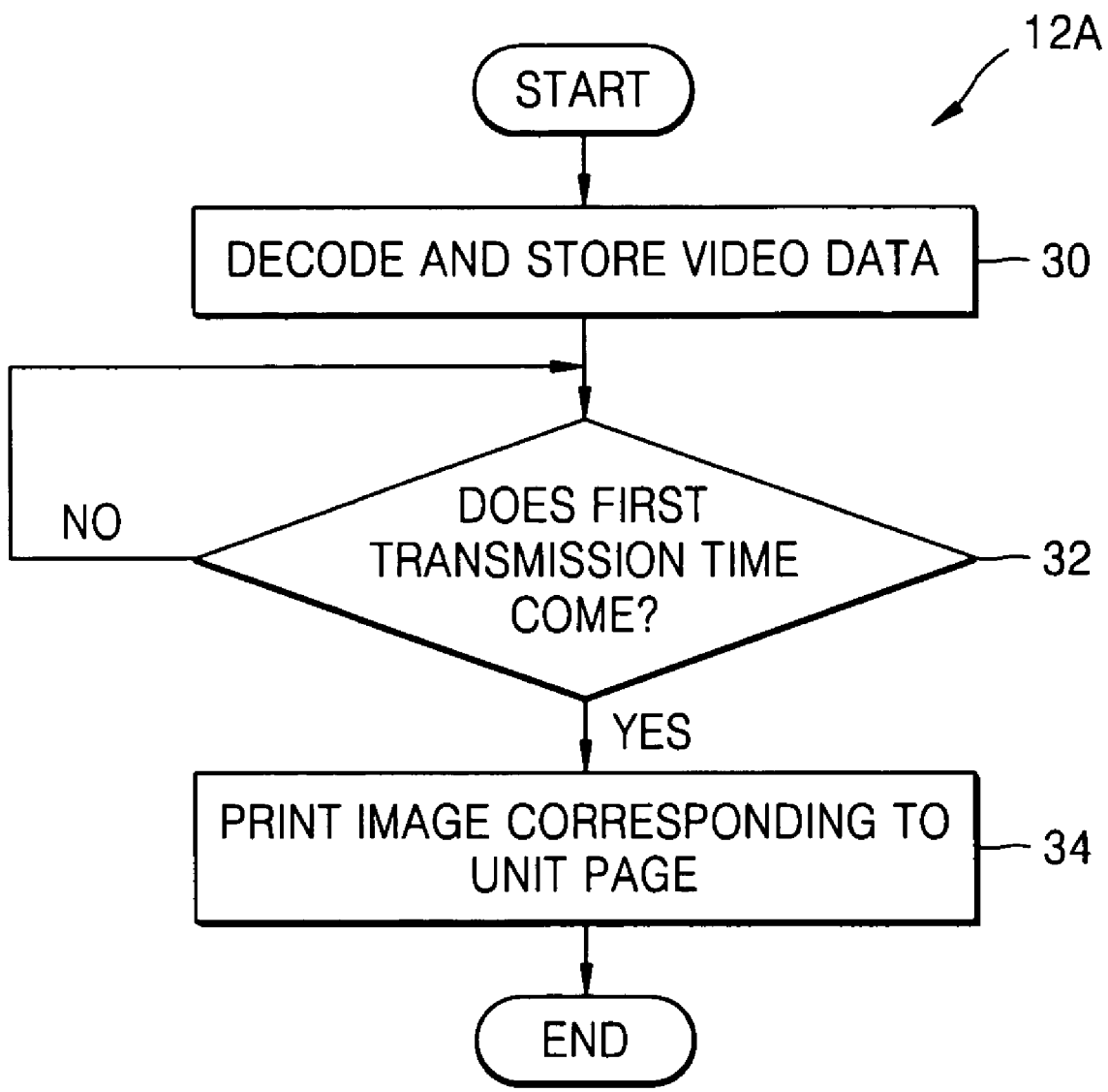
FIG. 3 is a flowchart illustrating step 12 shown in FIG. 1, according to an embodiment of the present invention.

FIG. 3 is a flowchart illustrating step 12 shown in FIG. 1, according to an embodiment of the present invention. Referring to FIG. 3, the method 12A includes decoding video data and storing the decoded video data in step 30, and printing an image using a storage result when a first transmission time comes in steps 32 and 34, respectively.

In order to perform an operation of printing an image from video data, first, in step 30, video data corresponding to a unit page to be printed, is decoded in units of frames, and a decoding result is stored. In this case, when the video data separated in step 10 is vector image data, in step 30, the video data is rendered. Here, rendering converts vector image data into raster image data. However, when the video data separated in step 10 is raster image data, in step 30, the video data does not need to be rendered. For example, the vector image data may be postscript image data, and the raster image data may be bitmap image data.

According to an embodiment of the present invention, step 30 may include decoding the video data in units of frames, storing a decoding result, and determining whether all of the video data corresponding to a unit page, is decoded and stored. Here, if it is determined that not all of the video data corresponding to the unit page is decoded and stored, the method continues the step of decoding and storing the video data. If it is determined that all of the video data corresponding to the unit page is decoded and stored, the method proceeds to step 32.

In step 32, whether a first transmission time comes is determined using a synchronization signal. Here, the first transmission time is a time going back from a time t when sound corresponding to audio data contained in the multimedia data is reproduced to a first predetermined period t1, and the first predetermined period t1 is a period required to print an image corresponding to a unit page using a decoding result with respect to frames corresponding to the unit page. If it is determined that the first transmission time does not come, the continues to check whether the first transmission time has come in step 32.

However, if it is determined that the first transmission time comes, in step 34, an image corresponding to a unit page is printed using a decoding result with respect to frames corresponding to the unit page.

Figure 4:
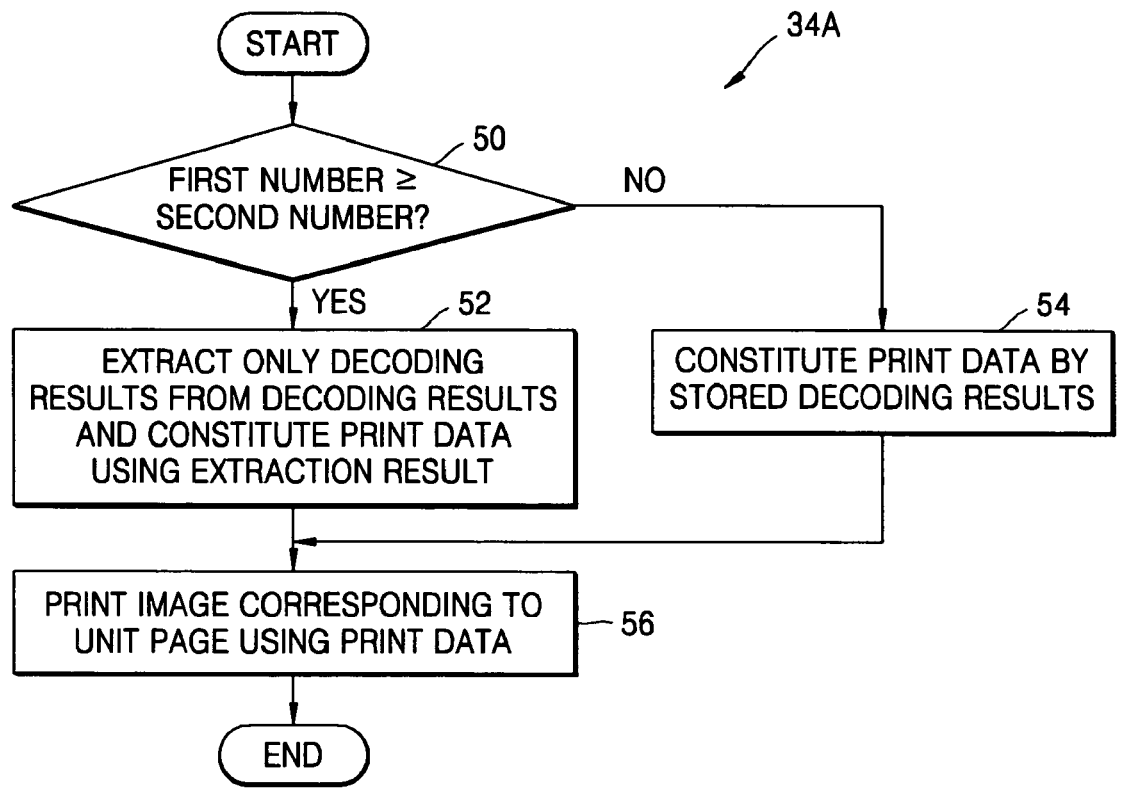
FIG. 4 is a flowchart illustrating step 34 shown in FIG. 3, according to an embodiment of the present invention.

FIG. 4 is a flowchart illustrating step 34 shown in FIG. 3, according to another embodiment of the present invention. Referring to FIG. 4, the method 34A includes constituting print data according to a comparison result of a first number and a second number (steps 50 through 54) and printing an image using print data (step 56).

If it is determined that the first transmission time comes, in step 50, whether the first number is greater than or equal to the second number is determined. Here, the first number X is a maximum number of frames contained in video data required to be printed per unit time in step 34. The first number X may be 24-30 per second depending on image quality, or it may be 3-6 per second. The first number X of a camera phone may typically be 3-6 per second. In addition, the second number Y is a maximum number of frames to be printed per unit time in step 34.

If it is determined that the first number is greater than or equal to the second number, in step 52, only decoding results corresponding to frames that do not exceed a third number Z are selectively extracted from the decoding results stored per unit page, and print data corresponding to a unit page is constituted using an extraction result. Here, the third number is a total number of frames that can be contained in a unit page to be printed in step 34 and is typically about 16-20.

However, if it is determined that the first number is smaller than the second number, in step 54, print data is constituted by the decoding results stored per unit page.

Consequently, the number F of frames contained in print data per unit page is the third number Z when the first number X is greater than or equal to the second number Y ($X \geq Y$). When the first number X is smaller than the second number Y ($X < Y$), the number F of frames contained in print data per unit page is expressed as $X*Z/Y$.

The following example will illustrate steps 52 and 54. Assuming that the first predetermined period t1 is 3 seconds and the third number Z is 20, the second number (Y=Z/3) is 6.67.

In this case, if the first number X which is a maximum number of frames contained in video data required to print per second is 30, the first number X is greater than or equal to the second number Y. Thus, in step 52, by repeating an operation of extracting 6 frames from 30 decoded frames, 18 frames are extracted for three seconds, and print data corresponding to a unit page is constituted by 18 extracted frames. In this case, in order to extract 6 frames from 30 frames, for example, one frame placed in a predetermined sequence can be selected every 5 frames.

However, if the first number X is four, the first number X is smaller than the second number Y, in step 54, by repeating an operation of selecting 4 decoded frames per second, 12 frames are selected for three seconds, and print data corresponding to a unit page is constituted by 12 selected frames.

After step 52 or 54, in step 56, an image corresponding to the unit page is printed using the print data.

Figure 5:
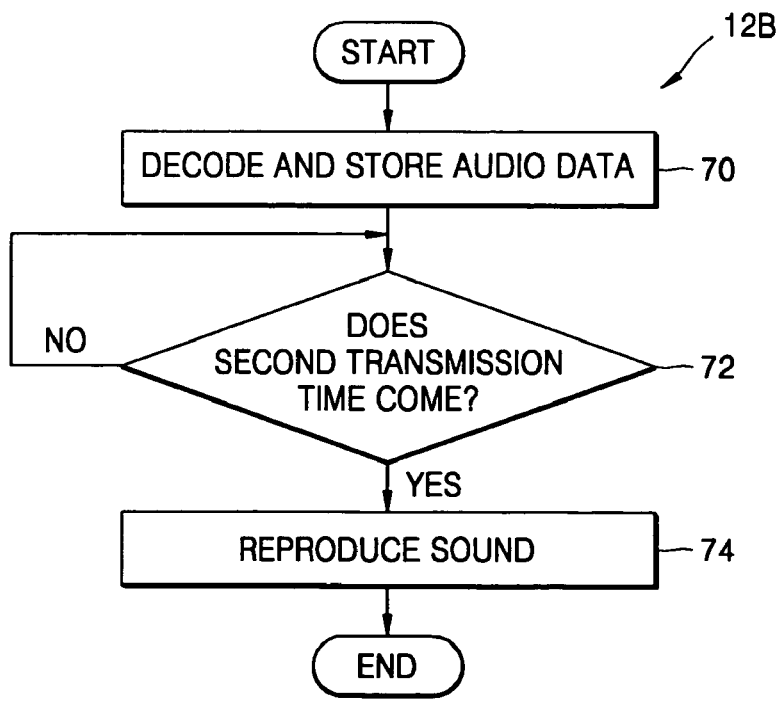
FIG. 5 is a flowchart illustrating step 12 shown in FIG. 1, according to an embodiment of the present invention.

FIG. 5 is a flowchart illustrating step 12 shown in FIG. 1, according to another embodiment of the present invention. Referring to FIG. 5, the method 12B includes decoding and storing audio data (step 70) and reproducing sound when a second transmission time comes (steps 72 and 74).

In order to perform an operation of reproducing sound corresponding to audio data, first, in step 70, audio data to be reproduced together with an image corresponding to a unit page to be printed is decoded in units of frames, and a decoding result is stored.

According to an embodiment of the present invention, step 70 may include decoding audio data in units of packets, storing a decoding result, and determining whether all of the audio data corresponding to the unit page is decoded and stored. Here, if it is determined that not all of the audio data corresponding to the unit page is decoded and stored, the method continues the step of decoding and storing the audio data. If it is determined that all of the audio data corresponding to the unit page is decoded and stored, the method proceeds to step 72.

In step 72, whether a second transmission time comes is determined using a synchronization signal. Here, the second transmission time is a time going back from a time t when an image is printed to a second predetermined period t2, and the second predetermined period t2 is a period required to perform step 74. If it is determined that the second transmission time does not come, the method continues at step 72. However, if it is determined that the second transmission time has come, in step 74, a decoding and storing result is amplified, and an amplification result is reproduced as sound.

Hereinafter, the structure and operation of an apparatus for reproducing multimedia data according to an embodiment of the present invention will be described in detail with reference to the attached drawings.

Figure 6:
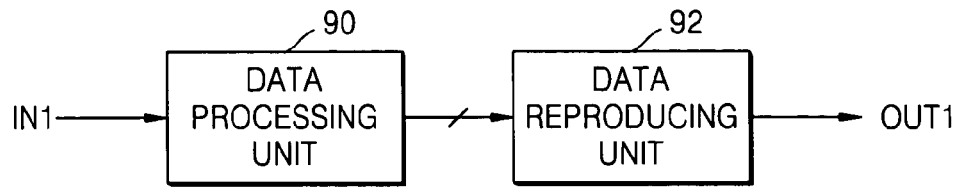
FIG. 6 is a block diagram of an apparatus for reproducing multimedia data according to an embodiment of the present invention.

FIG. 6 is a block diagram of an apparatus for reproducing multimedia data according to an embodiment of the present invention. Referring to FIG. 6, the apparatus for reproducing multimedia data according to an embodiment of the present invention includes a data processing unit 90 and a data reproducing unit 92.

In the apparatus illustrated in FIG. 6, the method for reproducing multimedia data shown in FIG. 1 may be performed. In order to perform step 10 shown in FIG. 1, the data processing unit 90 separates video data, audio data, and synchronization data from multimedia data input through an input terminal IN1 from another source, extracts a synchronization signal from the separated synchronization data, and outputs the separated video data, the separated audio data, and the extracted synchronization signal to the data reproducing unit 92.

Figure 7:
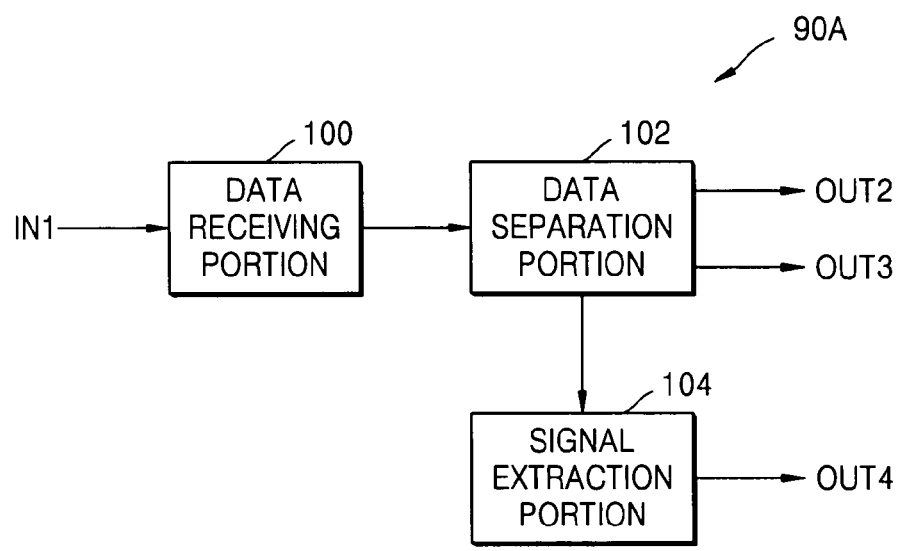
FIG. 7 is a block diagram of a data processing unit shown in FIG. 6, according to an embodiment of the present invention.

FIG. 7 is a block diagram of a data processing unit 90 shown in FIG. 6, according to an embodiment of the present invention. Referring to FIG. 7, the data processing unit 90A includes a data receiving portion 100, a data separation portion 102, and a signal extraction portion 104.

The data processing unit 90A shown in FIG. 7 performs step 10A shown in FIG. 2. In other words, in order to perform step 20, the data receiving portion 100 of the data processing unit 90A receives multimedia data through the input terminal IN1 and outputs the received multimedia data to the data separation portion 102. In this case, if the multimedia data is received by wireless via an external network bus, the data receiving portion 100 may be implemented with a wireless network card.

In order to perform step 22, the data separation portion 102 separates video data, audio data, and synchronization data from the multimedia data received from the data receiving portion 100, outputs the separated video data to the data reproducing unit 92 through an output terminal OUT2, outputs the separated audio data to the data reproducing unit 92 through an output terminal OUT3, and outputs the separated synchronization data to the signal extraction portion 104.

In order to perform step 24, the signal extraction portion 104 extracts the synchronization signal from the separated synchronization data input from the data separation portion 102 and outputs the extracted synchronization signal to the data reproducing unit 92 through an output terminal OUT4.

Meanwhile, in order to perform step 12 shown in FIG. 1, the data reproducing unit 92 prints an image corresponding to the separated video data input from the data processing unit 90, outputs a printing result through the output terminal OUT1, reproduces sound corresponding to the separated audio data input from the data processing unit 90, and outputs reproduced sound through the output terminal OUT 1. In this case, the data processing unit 92 synchronizes printing of an image and reproducing of sound in response to the extracted synchronization signal input from the data processing unit 90.

Figure 8:
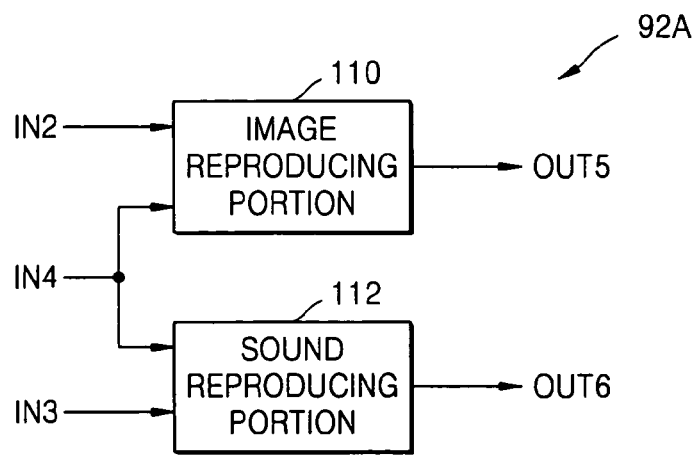
FIG. 8 is a block diagram of a data reproducing unit shown in FIG. 6, according to an embodiment of the present invention.

FIG. 8 is a block diagram of a data reproducing unit 92 shown in FIG. 6, according to an embodiment of the present invention. Referring to FIG. 8, the data reproducing unit 92A includes an image reproducing portion 110 and a sound reproducing portion 112.

The image reproducing portion 110 shown in FIG. 8 prints and reproduces an image corresponding to the separated video data input from the data processing unit 90 through an input terminal IN2 and outputs the reproduced image, that is, the printed image through an output terminal OUT5. In this case, the sound reproducing portion 112 reproduces sound corresponding to the separated audio data input from the data processing unit 90 through an input terminal IN3 and outputs reproduced sound though an output terminal OUT6. In this case, the image reproducing portion 110 and the sound reproducing portion 112 are synchronized with each other, print an image, and reproduce sound in response to the extracted synchronization signal input from the data processing unit 90 through an input terminal IN4.

Figure 9:
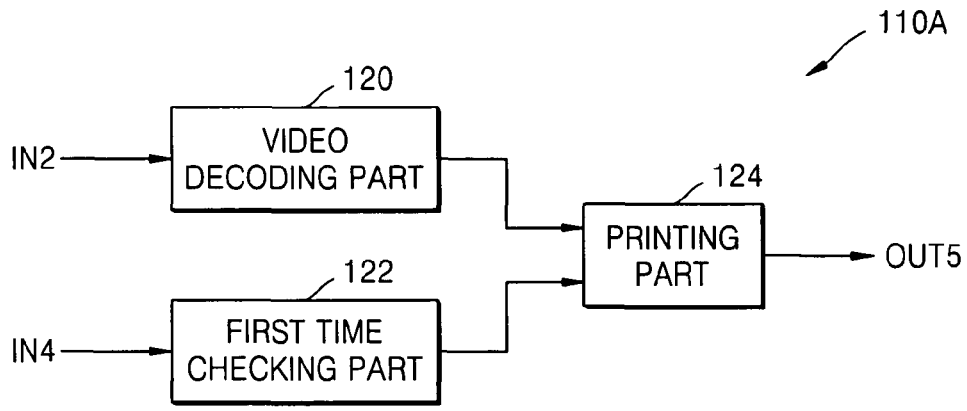
FIG. 9 is a block diagram of an image reproducing portion shown in FIG. 8, according to an embodiment of the present invention.

FIG. 9 is a block diagram of an image reproducing portion 110 shown in 8, according to an embodiment of the present invention. Referring to FIG. 9, the image reproducing portion 110A includes a video decoding part 120, a first time checking part 122, and a printing part 124.

The image reproducing portion 110A shown in FIG. 9 performs step 12A shown in FIG. 3.

In order to perform step 30, the video decoding part 120 decodes video data corresponding to a unit page to be printed, input from the data processing unit 90 through the input terminal IN2, in units of frames and stores a decoding result.

In order to perform step 32, the first time checking part 122 checks whether a first transmission time comes and outputs a checking result as a first control signal to the printing part 124 in response to a synchronization signal input from the data processing unit 90 through the input terminal IN4.

In order to perform step 34, the printing part 124 prints an image corresponding to a unit page from the decoding result input from the video decoding part 120 and outputs a printing result through the output terminal OUT5 in response to the first control signal input from the first time checking part 122, that is, if it is recognized from the first control signal that the first transmission time has come.

Figure 10:
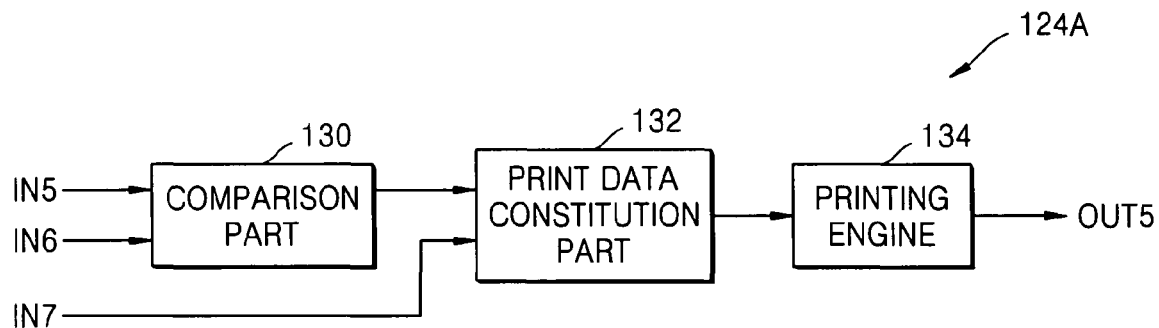
FIG. 10 is a block diagram of a printing part shown in FIG. 9, according to an embodiment of the present invention.

FIG. 10 is a block diagram of a printing part 124 shown in FIG. 9, according to an embodiment of the present invention. Referring to FIG. 10, the printing part 124A includes a comparison part 130, a print data constitution part 132, and a printing engine 134.

The printing part 124A shown in FIG. 10 performs step 34A shown in FIG. 4. In order to perform step 50 shown in FIG. 4, the comparison part 130 compares a first number of frames contained in video data required to be printed per unit time with a second number of frames which can be printed per unit time and outputs a comparison result to the print data constitution part 132 in response to a first control signal input from the first time checking portion 122 through an input terminal IN5. Here, the first number and the second number are input through an input terminal IN6.

In this case, in order to perform step 52 or 54, in response to a comparison result input from the comparison part 130 the print data constitution part 132 selectively selects only decoding results corresponding to frames that do not exceed a total number of frames that can be contained in a unit page to be printed, from among decoding results stored per unit page input from the video decoding part 120 through an input terminal IN7. The print data constitution part 132 constitutes print data using an extraction result or constitute print data using decoding results stored per unit page input from the video decoding part 120 through the input terminal IN7. The print data constitution part 132 outputs constituted print data to the printing engine 134. For example, if it is recognized from the comparison result input from the comparison part 130 that the first number is greater than or equal to the second number, the print data constitution part 132 performs step 52. If it is recognized from the comparison result that the first number is smaller than the second number, the print data constitution part 132 performs step 54.

In order to perform step 56, the printing engine 134 prints an image corresponding to the unit page from the print data input from the print data constitution part 132 and outputs a printing result through an output terminal OUT5.

Figure 11:
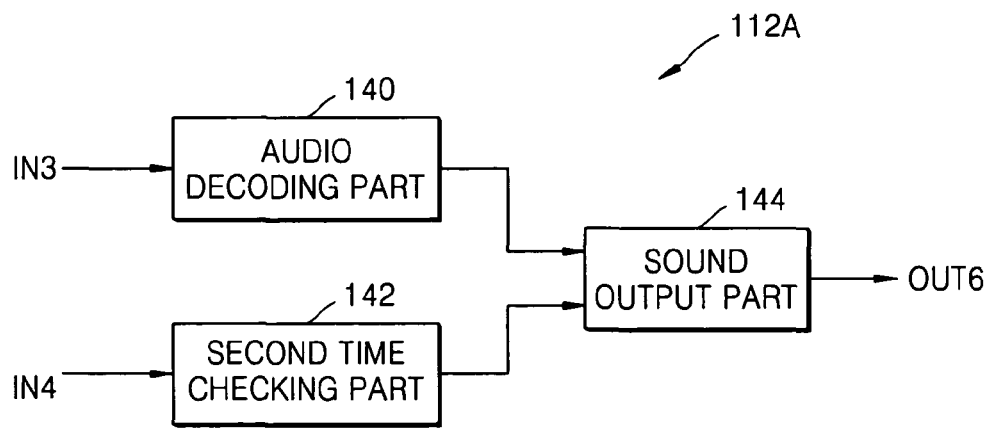
FIG. 11 is a block diagram of a sound reproducing portion shown in FIG. 8, according to an embodiment of the present invention.

FIG. 11 is a block diagram of a sound reproducing portion 112 shown in FIG. 8, according to an embodiment of the present invention. Referring to FIG. 11, the sound reproducing portion 112A includes an audio decoding part 140, a second time checking part 142, and a sound output part 144.

The sound reproducing portion 112A shown in FIG. 11 performs step 12B shown in FIG. 5.

In order to perform step 70 shown in FIG. 5, the audio decoding part 140 shown in FIG. 11 inputs audio data to be reproduced together with an image corresponding to a unit page to be printed from the data processing unit 90 through the input terminal IN3, decodes the input audio data in units of frames, and stores a decoding result. For example, the audio decoding part 140 decodes the audio data and converts the decoded audio data into an electrical signal having an analog shape.

In order to perform step 72, the second time checking part 142 checks whether the second transmission time comes, using the synchronization signal input from the data processing unit 90 through the input terminal IN4 and outputs a checking result as a second control signal to the sound output part 144.

In order to perform step 74, the sound output part 144 amplifies a storage result input from the audio decoding part 140, reproduces an amplification result as sound, and outputs reproduced sound through the output terminal OUT6 in response to the second control signal input from the second time checking part 142, that is, if it is recognized from the second control signal that the second transmission time has come. To this end, the sound output part 144 may provide an amplifier (not shown) for amplifying a storage result input from the audio decoding part 140 and a speaker (not shown) for outputting an amplification result as sound.

The apparatus for reproducing multimedia data shown in FIGS. 6 through 11, according to an embodiment of the present invention and embodiments thereof may be embedded in a printer (not shown).

As described above, in the method and apparatus for reproducing multimedia data according to an embodiment of the present invention, sound is reproduced while printing an image contained in multimedia data, such that the multimedia data, such as a movie or a motion picture, is more lively reproduced using a printer.

While this invention has been particularly shown and described with reference to a preferred embodiment thereof, it will be understood by those skilled in the art that various changes in form and details may be made therein without departing from the spirit and scope of the invention as defined by the appended claims and equivalents thereof.

What is claimed is:

1. A method for reproducing externally provided multimedia data in an image forming apparatus, the method comprising the steps of:
   (a) receiving externally-provided multimedia data at the image forming apparatus, separating video data comprising multiple frames, audio data, and synchronization data from the received multimedia data wherein the synchronization data synchronizes frames of said video data to said audio data, and extracting a synchronization signal from the synchronization data; and
   (b) synchronizing an operation of printing an image corresponding to said multiple frames of the video data and an operation of reproducing sound corresponding to the audio data with each other using the extracted synchronization signal and performing the operations such that said printed image corresponds to frames of said video data to which the audio data was synchronized by said synchronization data.

2. The method of claim 1, wherein step (a) comprises:
   receiving the multimedia data;
   separating the video data, the audio data, and the synchronization data from the received multimedia data; and
   extracting the synchronization signal from the separated synchronization data.

3. The method of claim 1, wherein the operation of printing the image in step (b) comprises:
   (b11) decoding the video data corresponding to a unit page to be printed in units of frames and storing the decoded video data;

(b12) determining whether a first transmission time comes, using the synchronization signal; and (b13) if it is determined that the first transmission time comes, printing the image corresponding to the unit page using the stored and decoded result;

wherein the first transmission time corresponds to a time going back from a time when sound is reproduced to a first predetermined period, and the first predetermined period corresponds to a period required to perform step (b13).

4. The method of claim 3, wherein step (b13) includes:

determining whether a first number of frames contained in the video data required to be printed per unit time is greater than or equal to a second number of frames to be printed per unit time in step (b13) if it is determined that the first transmission time has come;

selectively extracting only decoding results corresponding to frames that do not exceed a total number of frames that can be contained in a unit page to be printed from the decoding results stored per unit page and constituting print data using the extraction result if it is determined that the first number is greater than or equal to the second number;

constituting the print data using the decoding results stored per unit page if it is determined that the first number is smaller than the second number; and printing the image corresponding to the unit page using the print data.

5. The method of claim 3, wherein step (b11) includes rendering the video data.

6. The method of claim 1, wherein the operation of reproducing sound corresponding to the audio data includes:

(b21) decoding the audio data to be reproduced together with the image corresponding to a unit page to be printed in units of packets and storing the decoded audio data;

(b22) determining whether a second transmission time comes, using the synchronization signal; and (b23) if it is determined that the second transmission time comes, amplifying a storage result and reproducing an amplification result as sound;

wherein the second transmission time corresponds to a time going back from a time when the image is printed to a second predetermined period, and the second predetermined period corresponds to a period required to perform step (b23).

7. An image forming apparatus for reproducing externally provided multimedia data, the apparatus comprising:

a data processing unit, which receives externally-provided multimedia data, separates video data comprising multiple frames, audio data, and synchronization data from the received multimedia data wherein the synchronization data synchronizes frames of said video data to said audio data, and extracts a synchronization signal from the synchronization data; and a data reproducing unit, which synchronizes an operation of printing an image corresponding to said multiple frames of the separated video data and an operation of reproducing sound corresponding to the separated audio data with each other in response to the extracted synchronization signal and performing the operations such that said printed image corresponds to frames of said video data to which the audio data was synchronized by said synchronization data.

8. The apparatus of claim 7, wherein the data processing unit includes:

a data receiving portion, which receives the multimedia data;

a data separation portion, which separates the video data, the audio data, and the synchronization data from the received multimedia data; and a signal extraction portion, which extracts the synchronization signal from the separated synchronization data.

9. The apparatus of claim 7, wherein the data reproducing unit includes:

an image reproducing portion, which prints an image corresponding to the separated video data; and a sound reproducing portion, which reproduces sound corresponding to the separated audio data;

wherein the image reproducing portion and the sound reproducing portion operate while being synchronized with each other in response to the extracted synchronization signal.

10. The apparatus of claim 9, wherein the image reproducing portion includes:

a video decoding part, which decodes the video data corresponding to a unit page to be printed, input from the data processing unit, in units of frames and stores the decoded video data;

a first time checking part, which determines whether a first transmission time comes and outputs a checking result as a first control signal in response to the synchronization signal; and a printing part, which prints the image corresponding to the unit page from the decoding result input from the video decoding part in response to the first control signal;

wherein the first transmission time corresponds to a time going back from a time when sound is reproduced to a first predetermined period, and the first predetermined period corresponds to a period required to print the image from the decoding result in the printing part.

11. The apparatus of claim 10, wherein the printing part includes:

a comparison part, which compares a first number of frames contained in video data required to be printed per unit time with a second number of frames to be printed per unit time and outputs a comparison result in response to the first control signal;

a print data constitution part, which selectively selects only decoding results corresponding to frames that do not exceed a total number of frames that can be contained in a unit page to be printed, from decoding results stored per unit page input from the video decoding part and constitutes print data using an extraction result or constitutes print data using decoding results stored per unit page input from the video decoding part in response to a comparison result input from the comparison part; and a printing engine, which prints the image corresponding to the unit page from the print data input from the print data constitution part.

12. The apparatus of claim 7, wherein the sound reproducing portion includes:

an audio decoding part, which decodes the audio data to be reproduced together with the image corresponding to a unit page to be printed in units of packets and stores the decoded audio data;

a second time checking part, which checks whether a second transmission time comes, using the synchronization signal and outputs a checking result as a second control signal; and a sound output part, which amplifies a storage result input from the audio decoding part and reproduces an amplification result as sound in response to the second control signal;

wherein the second transmission time corresponds to a time going back from a time when the image is printed to a second predetermined period, and the second predetermined period corresponds to a period required to reproduce sound from the storage result in the sound output part.

13. The apparatus of claim 7, wherein the multimedia data is input from a personal computer, a person digital assistant (PDA), a camera phone or a digital camcorder.

14. A method for reproducing multimedia data which comprises video data, audio data and synchronization data in an image forming apparatus which comprises an image reproducing portion that reproduces the video data and a sound reproducing portion that reproduces the audio data, the method comprising the steps of:
- separating the video data comprising multiple frames, the audio data, and the synchronization data from the multimedia data, and extracting a synchronization signal from the synchronization data;
- generating a print data which comprises at least one of a page containing printable frames of the video data; and
- synchronizing an operation of printing an image of the print data and an operation of reproducing sound of the audio data with each other using the extracted synchronization and performing the operations.

* * * * *